United States Patent [19]

White et al.

[11] Patent Number: 4,557,041

[45] Date of Patent: Dec. 10, 1985

[54] APPARATUS FOR ASSEMBLING A DYNAMOELECTRIC MACHINE

[75] Inventors: Robert W. White; Frank R. Kuzan, both of DeKalb, Ill.

[73] Assignee: General Electric Company, Fort Wayne, Ind.

[21] Appl. No.: 613,135

[22] Filed: May 23, 1984

Related U.S. Application Data

[62] Division of Ser. No. 402,282, Jul. 27, 1982, Pat. No. 4,480,378.

[51] Int. Cl.[4] ...................... H02K 15/14; H02K 15/16
[52] U.S. Cl. ......................................... 29/732; 29/596; 228/165; 228/185; 310/42
[58] Field of Search ................... 29/596, 732; 310/42, 310/43, 258; 228/165, 185

[56] References Cited

U.S. PATENT DOCUMENTS

| | | | |
|---|---|---|---|
| 3,164,422 | 1/1965 | Shaffer et al. | 308/132 |
| 3,857,170 | 12/1974 | Stoner | 29/596 |
| 3,961,416 | 6/1976 | Otto | 29/596 |

Primary Examiner—Carl E. Hall
Attorney, Agent, or Firm—Joseph E. Papin

[57] ABSTRACT

Apparatus for securing a set of beams on a stationary assembly for a dynamoelectric machine. The apparatus has means for locating one end frame with an opposite end of at least one beam being seated thereon with tabs on the opposite ends of the beams being received in apertures of the end frame in spaced apart relation therefrom, respectively. Means is provided for biasing another end frame against the other opposite ends of the beams with tabs thereon being received in other apertures in the other end frame in spaced apart relation therefrom, respectively. Means is for simultaneously welding at least a part of the tabs to a part of the one and another end frame, respectively.

12 Claims, 14 Drawing Figures

APPARATUS FOR ASSEMBLING A DYNAMOELECTRIC MACHINE

CROSS-REFERENCE TO RELATED APPLICATIONS

This application is a division of application Ser. No. 402,282, filed July 27, 1982, now U.S. Pat. No. 4,480,378, and is related to the commonly assigned application of Robert W. White Ser. No. 402,320 filed July 27, 1982 entitled "Dynamoelectric Machine" (now U.S. Pat. No. 4,473,764 issued Sept. 25, 1984) and also to the commonly assigned Charles W. Otto application Ser. No. 377,554 filed May 12, 1982 entitled "Dynamoelectric Machine and Methods" (now U.S. Pat. No. 4,466,165 issued Aug. 21, 1984), and each of these aforementioned applications is incorporated herein by reference.

FIELD OF THE INVENTION

This invention relates in general to dynamoelectric machines and in particular to improved apparatus for assembling a dynamoelectric machine.

BACKGROUND OF THE INVENTION

In the past, various and sundry methods and apparatus have been employed in the assembly of dynamoelectric machines. For instance, U.S. Pat. No. 3,857,170 issued Dec. 31, 1974 to Jesse A. Stoner illustrates a method and apparatus for positioning components for the assembly together of such components. In this method and apparatus, a pair of opposite end frames, a rotor and a stator were aligned with respect to each other so as to compensate for any out-of-square opposite end faces of the stator, and a hardenable material was introduced between opposite end portions of a set of beams carried by the stator and the end frames so as to interconnect the dynamoelectric machine components in their aligned and assembled relation.

In another prior art method and apparatus for assembling the dynamoelectric machine illustrated in U.S. Pat. No. 3,164,422 issued Jan. 5, 1965 to P. B. Shaffer et al, one opposite end shield of such dynamoelectric machine had a generally central bearing assembly associated therewith and was located in a preselected position on a seat provided on an assembly fixture of the assembly apparatus. When so located on the assembly fixture seat, four spaced apart generally peripheral welding flanges integrally formed with the one opposite end shield extended generally vertically upwardly therefrom. A rotor and shaft assembly included a pair of opposite oil slinger-thrust members secured to opposite ends of the shaft, respectively, and one end of the shaft was inserted through the bearing assembly of the one opposite end shield until the oil slinger-thrust member on such shaft end was seated in engagement with the bearing assembly of the one opposite end shield. A locating recess associated with the assembly fixture of the apparatus was provided to receive the one shaft end of the rotor and shaft assembly generally as it was inserted through the bearing assembly of the one opposite end shield. With the one shaft end so received in the locating recess of the apparatus, the rotor and shaft assembly was located in a preselected position extending generally perpendicularly with respect to the seat of the assembly fixture on which the one opposite end shield was located. After the rotor and shaft assembly and the one opposite end shield were so located in the preselected positions thereof with respect to each other, a shim set of the apparatus was extended through ventilation openings provided therefor in the one opposite end shield into positions about the periphery of the rotor. At this time, a bore of a stator for the dynamoelectric machine was also positioned about the rotor with the shim set in shimming engagement therebetween so as to provide a generally uniform air gap between the periphery of the rotor and the stator bore. As the stator was lowered into position about the rotor, the lower end face was engaged with a plurality of locating pins therefor predeterminately located on the apparatus with respect to the seat on the assembly fixture thereof, and in this manner, the lower end face of the stator was predeterminately located or vertically spaced from the one opposite end shield located on such seat. At the same time, four peripheral welding surfaces of the stator were arranged within the four welding flanges of the one opposite end shield at least closely adjacent thereto. With the stator for the dynamoelectric machine so located on the locating pins of the apparatus and also with respect to the rotor and the one opposite end shield, the bearing assembly of the other of the opposite end shield was passed about the other opposite end of the shaft and into seating engagement with the other of the oil slinger-thrust member secured to the other shaft end. Like the one opposite end shield, the other opposite end shield was also provided with four spaced apart, generally peripheral welding flanges integrally formed therewith and extending generally vertically therefrom. As the bearing assembly of the other opposite end shield was passed about the other shaft end, the four welding flanges on the other opposite end shield were arranged about the four welding surfaces of the stator at least closely adjacent thereto and generally in axially aligned and spaced apart relation with the four welding flanges of the one opposite end shield. Another or opposite upper assembly fixture of the apparatus was gripped in engagement with the other opposite end shield, and the upper assembly fixture was actuated to apply a force to insure the engagements of the bearing assemblies in the opposite end shields with the opposite oil slinger-thrust members on the opposite ends of the shaft, respectively, thus ensuring that no end play existed between the rotor and shaft assembly and the opposite end shields. Thereafter, the upper assembly fixture of the apparatus was actuated to raise the other opposite end shield a preselected distance, generally between about 0.040" and about 0.050", which concurrently raised or spaced the bearing assembly on the other opposite end shield from its engagement with the oil slinger-thrust member on the other shaft end thereby to insert a preselected amount of end play into the dynamoelectric machine between the rotor and shaft assembly and the opposite end shields thereof. With the upper assembly fixture of the apparatus maintaining the other opposite end shield in its raised position to insure the maintenance of the preselected end play for the dynamoelectric machine, four welding units of the apparatus were then moved into a position for concurrently welding the four welding flanges of the one opposite end shield to the four peripheral welding surfaces of the stator associated therewith. After effecting these welds, the four welding units of the apparatus were subsequently moved into another position for concurrently welding the four welding flanges of the other opposite end shield to the four peripheral welding surfaces of the stator also associated therewith. Subsequent to the welding of the opposite end shields to the stator to effect the final assembly of the dynamoelectric machine in the assembly apparatus, the dynamoelectric machine in its assembled state was removed therefrom.

SUMMARY OF THE INVENTION

Among the several objects of the present invention may be noted the provision of an improved apparatus for assembling a dynamoelectric machine; the provision of such improved apparatus which obviates the introduction into the dynamoelectric machine of radial stresses sufficient to produce a non-uniform air gap between a bore of a stator of the stationary assembly and a rotor of a rotatable assembly of the dynamoelectric machine; the provision of such improved apparatus in which a plurality of welds interconnecting the beams and the opposite end frames of the stationary assembly for the dynamoelectric machine are predeterminately spaced from the stator thereof; the provision of such improved apparatus in which the welding of the opposite end frames to the beams of the stationary assembly occur generally simultaneously; the provision of such improved apparatus which insure sufficient self-alignment of a pair of bearing assemblies respectively associated with the opposite end frames of the dynamoelectric machine and journaling the shaft of the rotatable assembly so as to insure the free rotation of the rotatable assembly when the assembly of the components of the dynamo-electric machine is completed; the provision of such improved apparatus which compensates for warpage of the opposite end frames as well as skew in the bore of the stator. These as well as other objects and advantageous features of the present invention will be in part apparent and in part printed out hereinafter.

In general and in one form of the invention, apparatus is provided for securing a set of beams on a stationary assembly for a dynamoelectric machine to a pair of opposite end frames thereof. The beams have a pair of tabs on the opposite ends thereof, respectively, and the end frames have a pair of sets of apertures extending therethrough sized predeterminately larger than the tabs, respectively. In this apparatus, means is provided for locating one of the end frames with one of the opposite ends of at least one of the beams being seated thereon and with the tabs on the one opposite end of the beams being received in one of the aperture sets in the one end frame in spaced relation therefrom, respectively. Means is also provided for biasing the other of the end frames against the other of the opposite ends of at least two of the beams with the tabs on the other opposite ends of the beams being received in the other of the aperture sets in the other end frame in spaced relation therefrom, respectively. A plurality of means are operable for generally simultaneously welding at least a part of each of the tabs on the one and other opposite ends of the beam to a part of the one and other end frames at least generally adjacent each aperture of the one and other aperture sets when the tabs and the aperture sets are in the spaced apart relation thereof, respectively.

BRIEF DESCRIPTION OF THE DRAWINGS

Corresponding reference characters indicate corresponding parts throughout several views of the drawings.

The exemplifications set out herein illustrate the preferred embodiments of the present invention in one form thereof, and such exemplifications are not to be construed as limiting in any manner the scope of the invention.

DETAILED DESCRIPTION OF THE PREFERRED EMBODIMENTS

Figure 1:
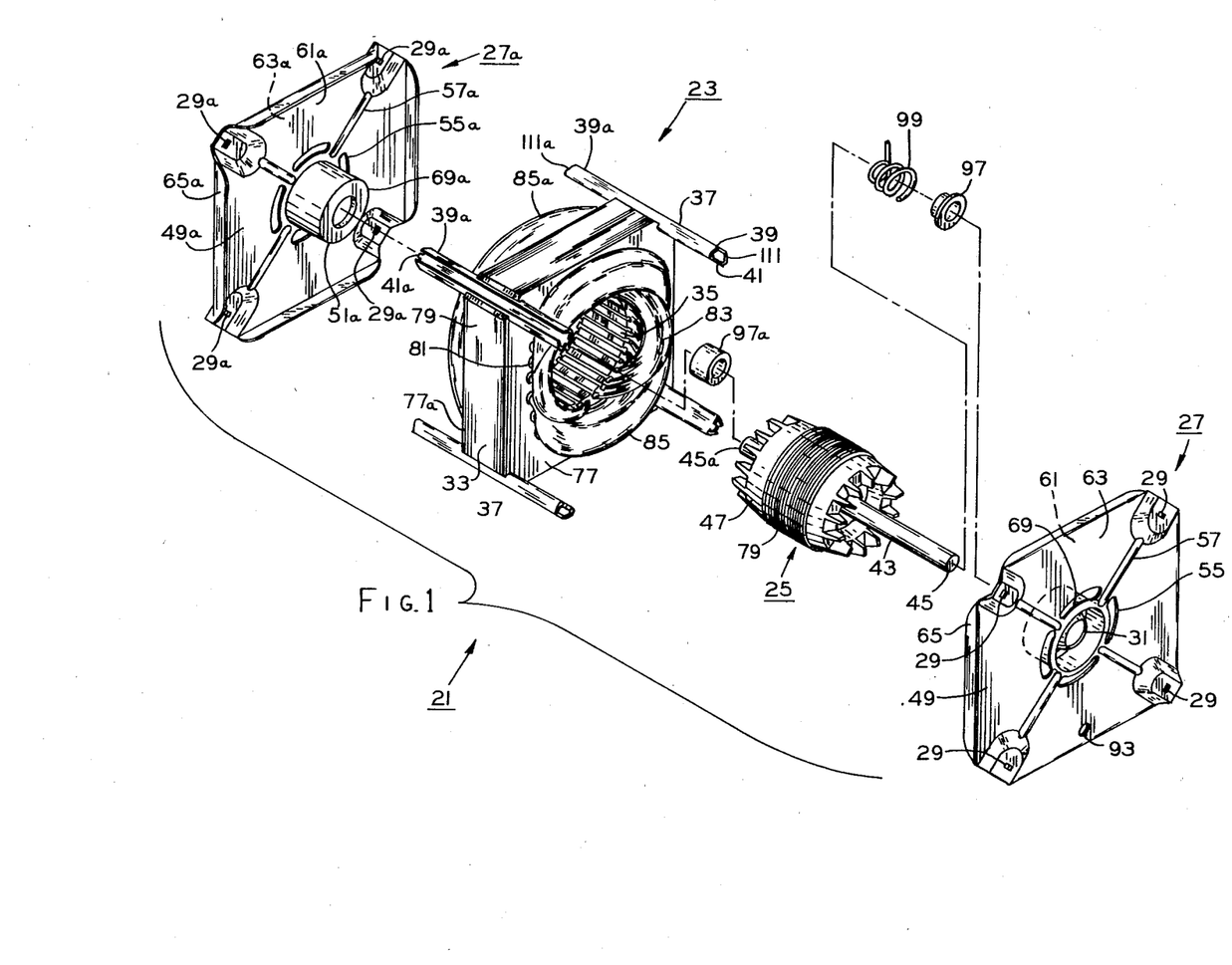
FIG. 1 is an exploded perspective view of a dynamoelectric machine.
Figure 2:
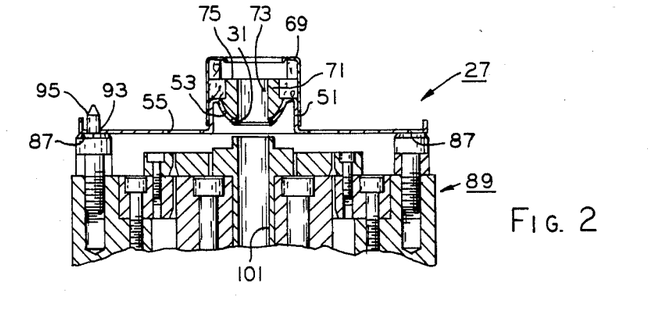
FIGS. 2-6 and 9 are partial sectional views illustrating principles which may be utilized in a method of assembling the dynamoelectric machine of FIG. 1.
Figure 3:
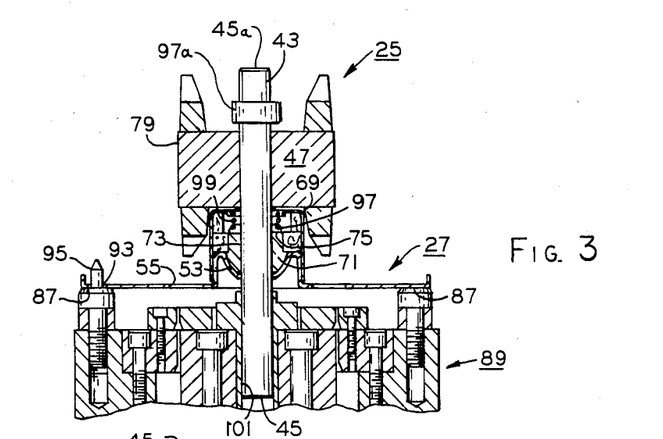
Figure 5:
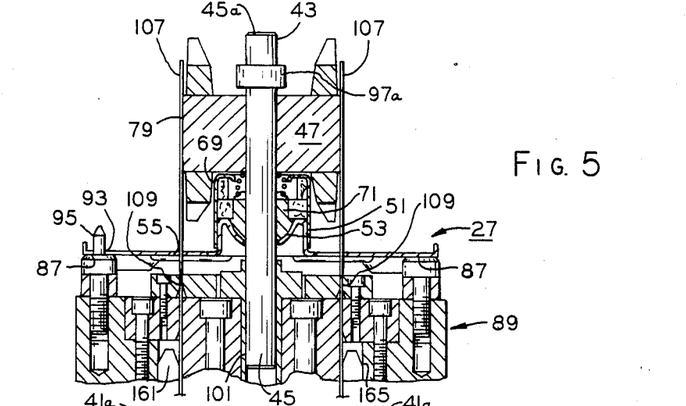
Figure 6:
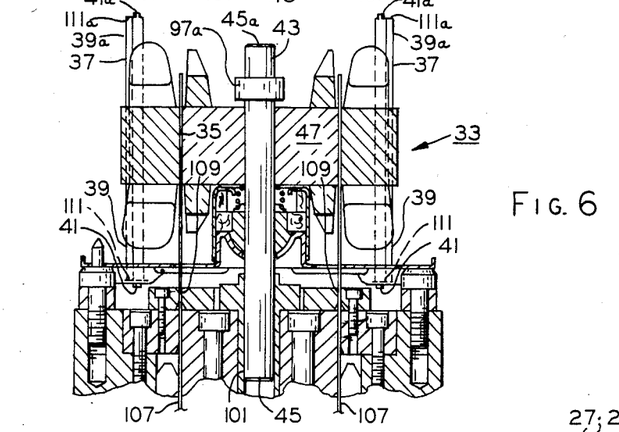
Figure 7:
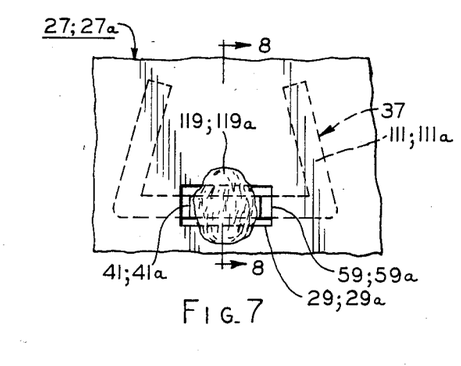
FIG. 7 is an enlarged partial elevational view of an end frame of the dynamoelectric machine of FIG. 1 showing an aperture thereof with a tab of one beam on a stator of the dynamoelectric machine received therein.

Referring to the drawings in general, there is illustrated a method of assembling a dynamoelectric machine 21 having a stationary assembly 23 and a rotatable assembly 25 (FIGS. 1-9). Stationary assembly 23 has a pair of opposite end frames 27, 27a with a pair of sets of apertures 29, 29a therethrough, respectively, and with a generally central opening 31 in end frame 27 (FIG. 1). A stator 33 of stationary assembly 23 has a bore 35 therethrough, and a set of beams 37 is secured to the stator. A pair of sets of opposite ends 39, 39a on beams 37 are provided with a pair of sets of oppositely extending tabs 41, 41a, respectively (FIG. 1). Rotatable assembly 25 includes a shaft 43 having a pair of opposite end portions or extensions 45, 45a, and a rotor 47 is secured to the shaft between the end portions thereof (FIG. 1). In this method, end frame 27 and rotatable assembly 25 are located generally in preselected or assembly positions with shaft end portion 45 extending through central opening 31 of the end frame (FIGS. 2 and 3). Stator bore 35 is aligned at least in part about rotor 47 of rotatable assembly 25 to define a desired or predetermined air gap therebetween, and tabs 41 on opposite ends 39 of beams 37 are received within apertures 29 in end frame 27 with the tabs and apertures being predeterminately arranged in spaced apart relation, respectively (FIGS. 5-8). Apertures 29a in end frame 27a are disposed generally about tabs 41a on opposite ends 39a of beams 37 with the tabs and apertures being predeterminately arranged in spaced apart relation, and end frames 27, 27a are conjointly welded at least generally adjacent apertures 29, 29a therein to tabs 41, 41a received within the aperture with the spaced apart relation between the tabs and apertures being maintained, respectively (FIG. 7).

Figure 9:
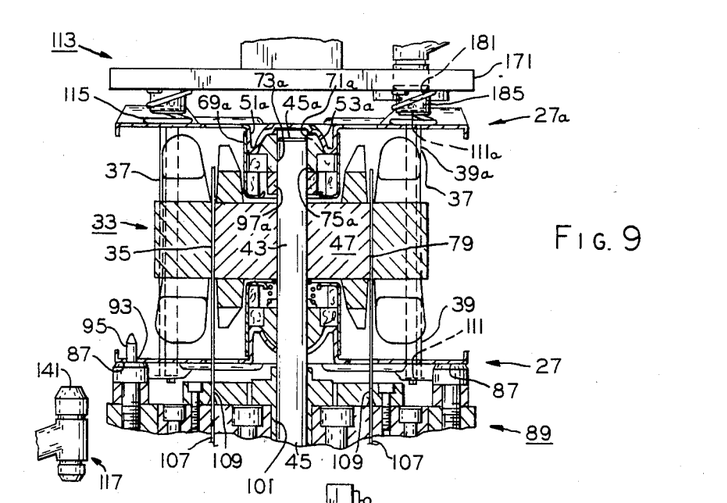

More particularly, and with specific reference to FIG. 1, end frames 27, 27a are lanced or otherwise formed from a metallic sheet material, such as for instance sheet steel or the like, and since the end frames are shown herein as being of generally like constructions, only end frame 27 will be further described with like parts of end frame 27a being designated by the letter "a" for the sake of brevity of disclosure. A generally planar section 49 of end frame 27 extends about a generally central portion thereof which includes a hub or recessed portion 51 having a partial spherical bearing seating surface 53 thereon with central opening 31 extending through the bearing seating surface for receiving shaft 43. A plurality of ventilation openings 55 are provided through planar section 49 of end frame 27 about hub portion 51 thereof, and a plurality of strengthening means, such as ribs 57 or the like for instance, may be provided in the planar section, if desired. Apertures or generally elongate slots 29 each have a sidewall 59 extending between a pair of opposite sides or faces 61, 63 of end frame 27, and the apertures are arranged in preselected locations generally radially outwardly of hub portion 51 and generally adjacent a peripheral marginal edge or circumferential portion 65 of the end frame. A set of beam seating surfaces 67 are provided on opposite face 63 of end frame 27 at least generally adjacent the intersection of aperture sidewalls 59 with end frame face 63. While the constructions and configurations of end frames 27, 27a are described and illustrated herein for purposes of disclosure, it is contemplated that other end frames having different constructions and configurations as well as being formed in different manners and of different materials may be utilized within the scope of the invention so as to meet at least some of the objects thereof. Further, while bearing seating surface 53a of end frame 27a is illustrated as being closed, as seen in FIG. 9, it is contemplated that a shaft receiving opening similar to opening 31 in end frame 27 may be provided in end frame 27a within the scope of the invention so as to meet at least some of the objects thereof.

A pair of lubrication and bearing systems 69, 69a are associated or preassembled with end frames 27, 27a about hub portions 51, 51a thereof so as to form respective units, and such systems include a pair of self-aligning bearings or bearing means 71, 71a having a pair of shaft journaling bores 73, 73a therethrough with a pair of thrust taking surfaces 75, 75a on the bearings extending generally about the bores thereof, respectively. If a more detailed discussion of the construction of lubrication and bearing systems 69, 69a is desired, reference may be had to the aforementioned Charles W. Otto application Ser. No. 377,554 filed May 12, 1982.

Stator 33 has a pair of opposite ends or end faces 77, 77a interconnected by a peripheral surface 79 in which beams 37 are fixedly received. Bore 35 of stator 33 extends generally axially therethrough intersecting with stator end faces 77, 77a, and a plurality of winding means accommodating slots 81 are also provided in the stator intersection with both the stator bore and the stator end faces, respectively. Winding means 83, such as a plurality of conductor turns or coils thereof, is disposed in slots 81 with suitable insulation therebetween, and the winding means has a pair of opposite, generally annular groupings of end turns 85, 85a disposed generally about stator bore 35 adjacent stator end faces 77, 77a, respectively. If a more detailed discussion of the component parts of stationary and rotatable assemblies 23, 25 of dynamoelectric machine 21 is desired, reference may be had to the aforementioned application Ser. No. 402,320.

In one aspect of the method of assembling dynamoelectric machine 21, end frame 27 is located or oriented in a preselected or assembly position on a supporting means, such as a location seat 87 or the like for instance, provided therefor on a lower assembly fixture 89 of an apparatus 91 for assembling the dynamoelectric machine, as best seen in FIGS. 2 and 10-13. As end frame 27 is placed on location seat 87 in FIG. 2, an orientation or locating opening 93 in the end frame is passed over or received about locating or orientation means, such as for instance a pin 95 or the like, predeterminately arranged on lower assembly fixture 89 with respect to location seat 87 thereof. Thus, with end frame 27 so disposed in its preselected position on location seat 87 and with pin 95 extending through orientation opening 93 in the end frame, the end frame is arranged in its assembly position with respect to lower assembly fixture 89 for subsequent assembly with other components of dynamoelectric machine 21.

A pair of thrust taking devices, such as for instance thrust collars 97, 97a or the like, are assembled about opposite end portions 45, 45a of shaft 43, respectively. A thrust spring 99 is biased between a part or end face of rotor 47 and thrust collar 97 which is slidable on shaft end portion 45, and thrust collar 97a is disposed in a fixed position in gripping engagement about shaft end portion 45a. Of course, the assembly of thrust collars 97, 97a and thrust spring 99 onto shaft 43 may be accomplished either before, after, or generally simultaneously with the above discussed placement of end frame 27 on location seat 87 therefor. Shaft end portion 45 is then passed or inserted through bore 73 in bearing 71 of lubrication and bearing system 69 on end frame 27 and also through central opening 31 thereof, and thrust collar 97 is moved into engagement with thrust taking surface 75 on the bearing, as best seen in FIG. 3. With thrust collar 97 so seated against bearing 71, shaft end portion 45 is moved further through bearing bore 73 and central opening 31 of end frame 27 into guiding and locating engagement with a locating recess, such as for instance a sleeve 101 or the like, provided therefor in lower assembly fixture 89. Of course, in response to this further movement of shaft end portion 45 into locating recess 101, thrust spring 99 is compressed in caged relation between rotor 47 and thrust collar 97 seated against bearing 71. When shaft end portion 45 is so received in locating recess 101, it may be noted that rotatable assembly 25 is located in a preselected or assembly position with respect to end frame 27 on location seat 87, and in this assembly position, the rotational axis of the rotatable assembly is arranged so as to be generally coincidental with an assembly axis A of lower assembly fixture 89, i.e. generally perpendicular to location seat 87 of the lower assembly fixture and to end frame 27 in its located assembly position thereon.

Figure 4:
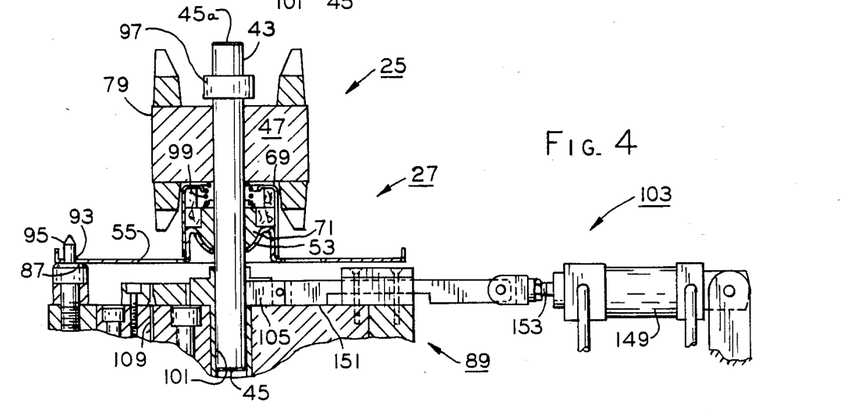

A locking mechanism 103 associated with lower assembly fixture 89 may be actuated by suitable means, as discussed in greater detail hereinafter, so as to displace a plunger 105 thereof into holding or locking engagement with a part of shaft end portion 45 within locating recess 101. In this manner with plunger 105 of locking mechanism 103 in the holding engagement thereof with shaft end portion 45, rotatable assembly 25 is retained in its assembly position against displacement movement in response to the compressive force of thrust spring 99 acting thereon, as best seen in FIG. 4. In other words the locking engagement of plunger 105 with shaft end portion 45 in locating recess 101 acts to cage thrust spring 99 in its compressed state between rotor 47 and thrust collar 97 biased against thrust surface 75 of bearing 71, and the caging of the thrust spring by locking mechanism 103 retains the shaft end portion against displacement from the locating recess thereby to maintain rotatable assembly 25 in its assembly position.

With rotatable assembly 25 so maintained in its preselected position by locking mechanism 103, as discussed above, a set of shims 107 may be passed or extended through a set of shim openings or passage means 109 provided therefor through lower assembly fixture 89 and also through ventilation openings 55 in end frame 27 which are aligned with the shim openings, and the shims are thereby positioned or disposed generally about peripheral surface 79 of rotor 47, as best seen in FIG. 5.

With shims 107 so disposed about peripheral surface 79 of rotor 47, as discussed above, bore 35 of stator 33 may be arranged or otherwise aligned about the rotor peripheral surface with the shims extending in shimming engagement therebetween so as to predeterminately define or establish the aforementioned desired generally uniform air gap between the stator bore and the rotor peripheral surface, as best seen in FIG. 6. While it is preferred that bore 35 of stator 33 be axially perpendicular to the opposite end faces of the stator, such bores in some stators may be skewed slightly with respect to the stator end faces. However, even if bore 35 of stator 33 is skewed, the disposition of shims 107 in shimming engagement between the stator bore and peripheral surface 79 of rotor 47 serves at least in part to assure the establishment of the generally uniform air gap therebetween.

Figure 8:
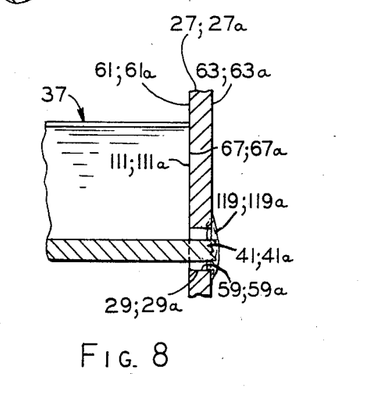
FIG. 8 is a sectional view taken along line 8—8 in FIG. 7.

Generally as stator bore 35 is disposed about rotor 47 and shims 107, as discussed above, tabs 41 on opposite end portions 39 of beams 37 are passed or inserted at least in part through apertures 29 in end frame 27 while the end frame is disposed in its preselected position on seat 87 of lower assembly fixture 89. It may be noted that sidewalls 59, 59a of apertures 29, 29a are predeterminately sized so as to be predeterminately larger than tabs 41, 41a received therein, respectively, as best seen in FIGS. 7 and 8. Thus, when tabs 41 are received in aperture 29 of end frame 27, the tabs are predeterminately arranged in spaced apart relation from sidewalls 59 of the apertures, respectively. It may be further noted that even if bore 35 of stator 33 is somewhat skewed when it is disposed about rotor 47 with shims 107 in shimming engagement therebetween, as previously discussed, the predetermined sizing of tabs 41, 41a and apertures 29, 29a to establish the spaced apart relation therebetween is effective to accommodate such stator bore skew.

In this vein due to improper manufacturing and/or handling techniques and thermal shrinkage and/or expansion of the material from which the end frames are formed, the end frames may be warped or otherwise bent from the desired formed configuration thereof. In the event of the occurrence of the aforementioned warpage in end frames 27, 27a, it may be further noted that the predetermined sizing of tabs 41, 41a and apertures 29, 29a to establish the spaced apart relation therebetween is also effective to accommodate such warpage in the end frames. Therefore, in one aspect of the invention, the predetermined spaced apart relation of tabs 41 from sidewalls 59 of apertures 29 when the tabs are received therein, as discussed above, not only accommodates undesirable skew in bore 35 of stator 33 but also undesirable warpage in end frame 29 during the assembly of dynamoelectric machine 21.

A pair of sets of opposite facing abutment surfaces 111, 111a are provided on opposite end portions 39, 39a of beams 37, and tabs 41, 41a extend generally axially from the abutment surfaces, respectively, as best seen in FIGS. 1 and 8. Thus, when tabs 41 on beams 37 are passed into apertures 29 of end frame 27 with the spaced apart relation being established therebetween, as previously discussed, an abutment surface 111 on at least one of beams 37 is seated aainst a confronting seating surface 67 therefor on end frame 27 at least generally adjacent the aperture in which the tab on the at least one beam is received. Of course, if bore 35 of stator 33 was not undesirably skewed and if end frame 27 was not undesirably warped, then abutment surface 111 of each beam would be seated against each confronting seating surface 67 therefor on end frame 27 at least generally adjacent aperture 29 therein. In the event one of the opposite side edges of tabs 41 might be abutted against a confronting part of sidewalls 59 of apertures 29 when the tabs are passed into the apertures, stator 33 and beams 37 may be concurrently adjusted or rotated generally about peripheral surface 79 of rotor 47 so as to space apart the opposite side edges of the tabs from the confronting parts of the aperture sidewalls in end frame 27, as best seen in FIG. 7.

After the disposition of tabs 41 and abutment surfaces 111 of beams 37 with respect to apertures 29 and seating surfaces 67 of end frame 27, as discussed above, bore 73a in bearing 71a of lubrication and bearing system 69a on end frame 27a is fitted or otherwise engaged about end portion 45a of shaft 43, as best seen in FIG. 9. With bearing bore 73a so received about shaft end portion 45, end frame 27a is moved downwardly so as to pass apertures 29a therein over tabs 41a on opposite end portions 39, 39a of beams 37 with sidewalls 59a of apertures 29a being predeterminately arranged in spaced apart relation from tabs 41a in the same manner as discussed hereinbefore with respect to tabs 41 and apertures 21 in end frame 27. This downward movement of end frame 27a is terminated when abutment surfaces 111a on at least two of beams 37 become seated against confronting seating surfaces 67a on end frame 27a at least generally adjacent apertures 29a in which tabs 41 are received thereby to define a preselected or assembly position of the end frame. Thus, when tabs 41a are received in aperture 29a of end frame 27a, as discussed above, the tabs are predeterminately arranged in spaced apart relation from sidewalls 59a of the apertures, respectively. Again, it may be noted that even if bore 35 of stator 33 is undesirably skewed when disposed about rotor 47 with shim 107 in shimming engagement therebetween and even if end frame 27a is undesirably warped, the predetermined sizing of tabs 41a and apertures 29a to predeterminately establish the spaced apart relation therebetween is effective to accommodate not only undesirable skew of stator bore 35 but also undesirable warpage in end frame 27a. Of course, if bore 35 of stator 33 is not undesirably skewed and if end frame 27a is not undesirably warped, then abutment surfaces 111a of each beam 37 would be seated against each confronting seating surface 67a therefor on end frame 27a at least generally adjacent apertures 29a therein. In the event one of the side edges of tabs 41a might be abutted against a confronting part of sidewalls 59a of apertures 29a when the tabs are received therein, end frame 27a may be adjusted or rotated generally about the engagement of bore 73a of bearing 71a with shaft end portion 45a so as to space apart the opposite side edges of the tabs from the confronting parts of the aperture sidewalls in end frame 27a, respectively.

With end frame 27a arranged in its assembly position, as discussed above, an upper assembly fixture 113 of apparatus 91 may be protractively actuated downwardly toward the end frame in order to bias into engagement therewith a set of resilient means, such as for instance coil springs 115 or the like, carried by the upper assembly fixture. When resilient means or springs 115 are engaged with end frame 27a, the compressive forces of the springs urge the end frame into its assembled position with the spaced apart relation between apertures 29a in the end plate and tabs 41a on beams 37 being maintained, respectively. At this time, locking mechanism 103 may be deactivated so as to interrupt the holding engagement between plunger 105 of the locking mechanism and opposite end portion 45 of shaft 43 received in locating recess 101 of lower assembly fixture 89 which, as previously mentioned, was effective to maintain rotatable assembly 25 in the assembly position thereof against the compressive force of the caged thrust spring 99. Therefore, when the holding force of locking plunger 105 is released from shaft end portion 45, the compressive force of thrust spring 99 is effective to move rotatable assembly upwardly relative to end frames 27, 27a and stator 33 in the assembly positions thereof. Upon this upward movement of rotatable assembly 25 in response to the compressive force of thrust spring 99, rotor 47 is slidably repositioned within stator bore 35 on shims 107 interposed therebetween, and such upward movement is terminated when thrust collar 97a on end portion 45a of shaft 43 becomes biased in engagement with thrust taking surface 75a of bearing 71a in lubrication and bearing system 69a on end frame 27a. In this manner, end play is provided in dynamoelectric machine 21 with thrust spring 99 urging thrust collars 97, 97a into engagement with thrust taking surfaces 75, 75a of bearings 71, 71a, respectively, as discussed above; however, it may be noted that the compressive forces of springs 115 on upper assembly fixture 113 are predeterminately greater than that of thrust spring 99 thereby to insure that end frame 27a is not displaced from its assembly position on beams 37 when the compressive force of the thrust spring is exerted against the end frame through the seating engagement of bearing 71a on bearing seating surface 53a of the end frame.

Figure 11:
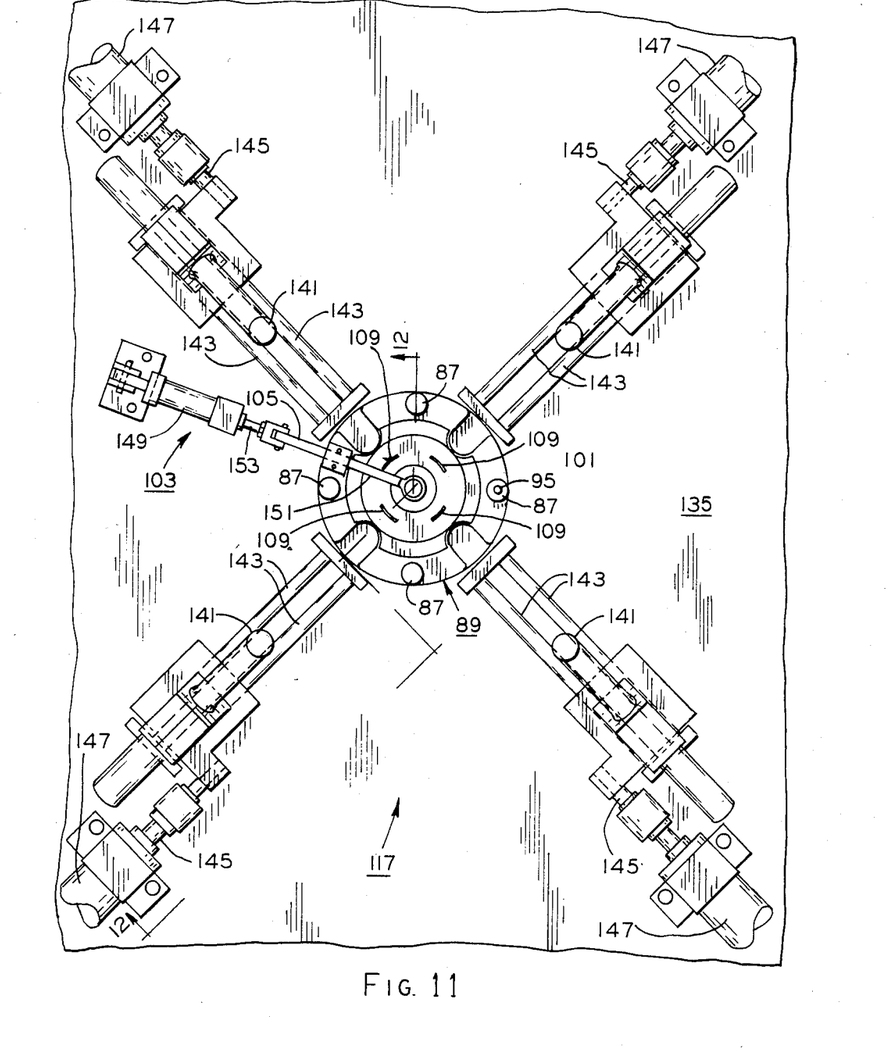
FIG. 11 is a plan view of a lower assembly fixture of the apparatus of FIG. 10, partial sectional views of the lower assembly fixture being shown in FIGS. 3 and 4.
Figure 13:
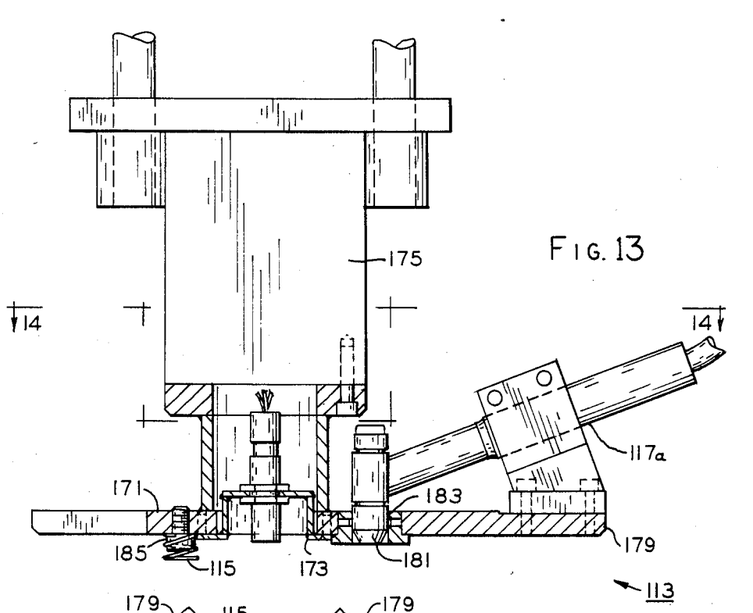
FIG. 13 is an enlarged partial side elevational view of an upper assembly fixture of the apparatus of FIG. 10, a section of the upper assembly fixtures being shown in FIG. 9.
Figure 14:
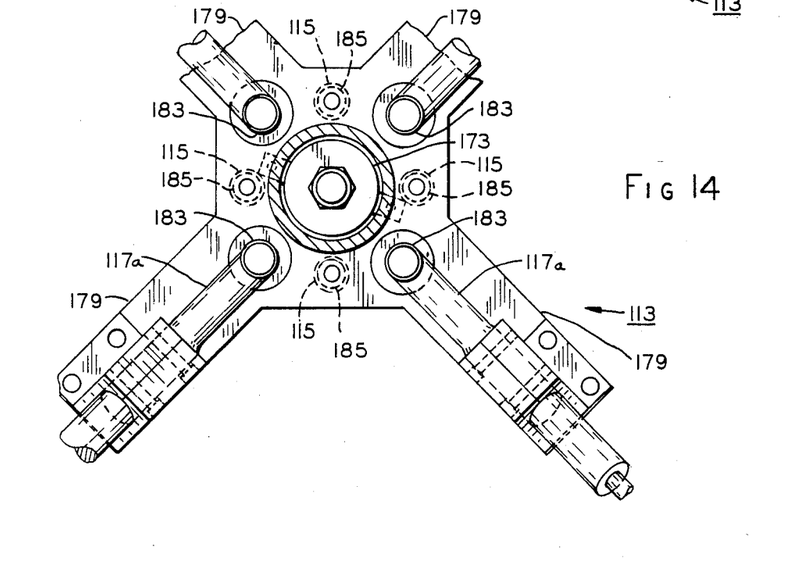
FIG. 14 is a top elevational view of the upper assembly fixture of FIG. 13.

As illustrated in FIG. 9 and as best seen in FIGS. 11, 13, and 14, a pair of sets of welding means 117, 117a are provided for generally simultaneously welding end frames 27, 27a at least generally adjacent sidewalls 59, 59a of apertures 29, 29a therein to tabs 41, 41a on opposite end portions 39, 39a of beams 37 extending through the apertures, respectively, as best seen in FIGS. 7 and 8. A pair of sets of welds 119, 119a thus created by the welding means span across at least a part of the space predeterminately established between tabs 41, 41a and aperture sidewalls 59, 59a thereby to inteconnect the end frames against displacement from the opposite ends of the beams when the end frames and stator 33 are in the assembly positions thereof, respectively. Welding means 117 are protractively and retractively movable on lower assembly fixture 89 with respect to preselected welding positions therefore, respectively, and welding means 117a are carried by upper assembly fixture 113 so as to be conjointly movable therewith to the preselected welding positions, as discussed in greater detail hereinafter.

Subsequent to the welding of end frames 27, 27a and beams 37, shims 107 are retracted through ventilation openings 55 in end frame 27 and shim passages 109 in location seat 87 of lower assembly fixture 89 so as to be removed from shimming engagement between stator bore 35 and rotor peripheral surface 79. Thus, upon the retraction of shims 107, it may be noted that the aforementioned generally uniform air gap established by shims 107 between stator bore 35 and rotor peripheral surface 79 is maintained by the welded interconnection of end frames 27, 27a with beams 37 of stator 33 since not only undesirable skew of the stator bore but also undesirable warpage of the end frames is accommodated by this method of assembling dynamoelectric machine 21, as previously discussed. To complete the description of this method of assembling dynamoelectric machine 21, upper assembly fixture 113 is retracted upwardly disengaging its springs 115 from end frame 27a, and the dynamoelectric machine may be removed from apparatus 91 displacing end frame 27 and shaft end portion 45 from location seat 87 and locating recess 101 of lower assembly fixture 89.

With reference again to the drawings in general and recapitulating at least in part with respect to the foregoing, apparatus 91 is provided in one form of the invention for securing beams 37 on stationary assembly 23 for dynamoelectric machine 21 to end frames 21, 21a thereof with the beams having tabs 41, 41a on opposite ends 39, 39a thereof and with the end frames having apertures 29, 29a extending therethrough predeterminately sized larger than the tabs, respectively (FIGS. 1-14). Means, such as location seat 89 of lower assembly fixture 87 or the like for instance, is provided for locating end frame 27 with opposite end portion 39 of at least one of beams 37 seated thereon and with tabs 41 in apertures 29 of end frame 27 arranged predeterminately in spaced apart relation therefrom, respectively (FIGS. 2, 7, 8, 11, and 13). Resilient means, such as springs 115 of upper assembly fixture 113 or the like for instance, is provided for biasing end frame 27a against opposite end portions 39a of at least two of beams 37 with tabs 41a on opposite end portions 39a of the beams being received in apertures 29a of end frame 27a and arranged predeterminately in spaced apart relation therefrom, respectively (FIGS. 7-9 and 13). Welding means 117, 117a are provided for generally simultaneously welding tabs 41, 41a to a part of end frames 27, 27a at least generally adjacent apertures 29, 29a when the tabs and the apertures are in the spaced apart relation thereof, respectively (FIGS. 7-9 and 11-13).

Figure 10:
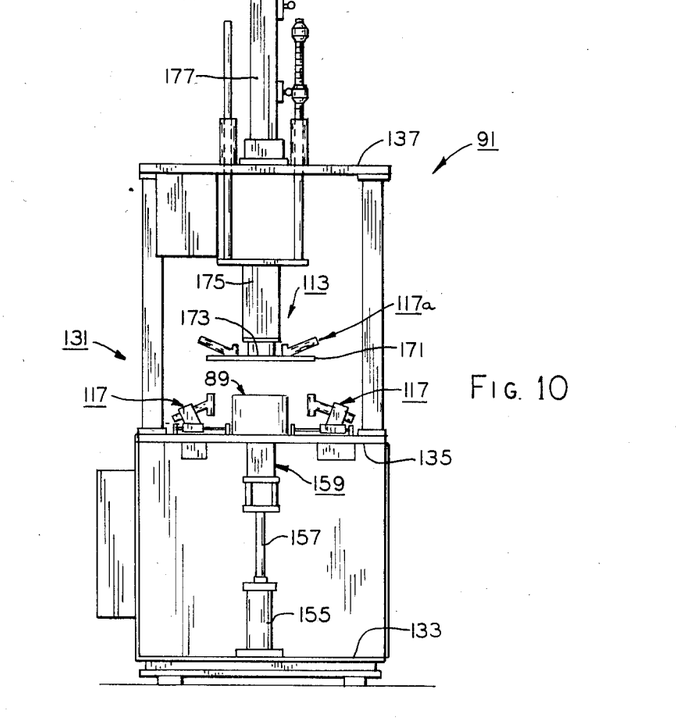
FIG. 10 is a schematic front elevational view of an apparatus in one form of the invention for assembling the dynamoelectric machine of FIG. 1.

More particularly and with specific reference to FIGS. 10-13, apparatus 91 comprises a work station having a frame or housing 131 including a base plate or lower cross member 133, an intermediate plate or cross member 135, and a top plate or cross member 137 which are respectively secured to the frame by suitable means, as best seen in FIG. 10.

Figure 12:
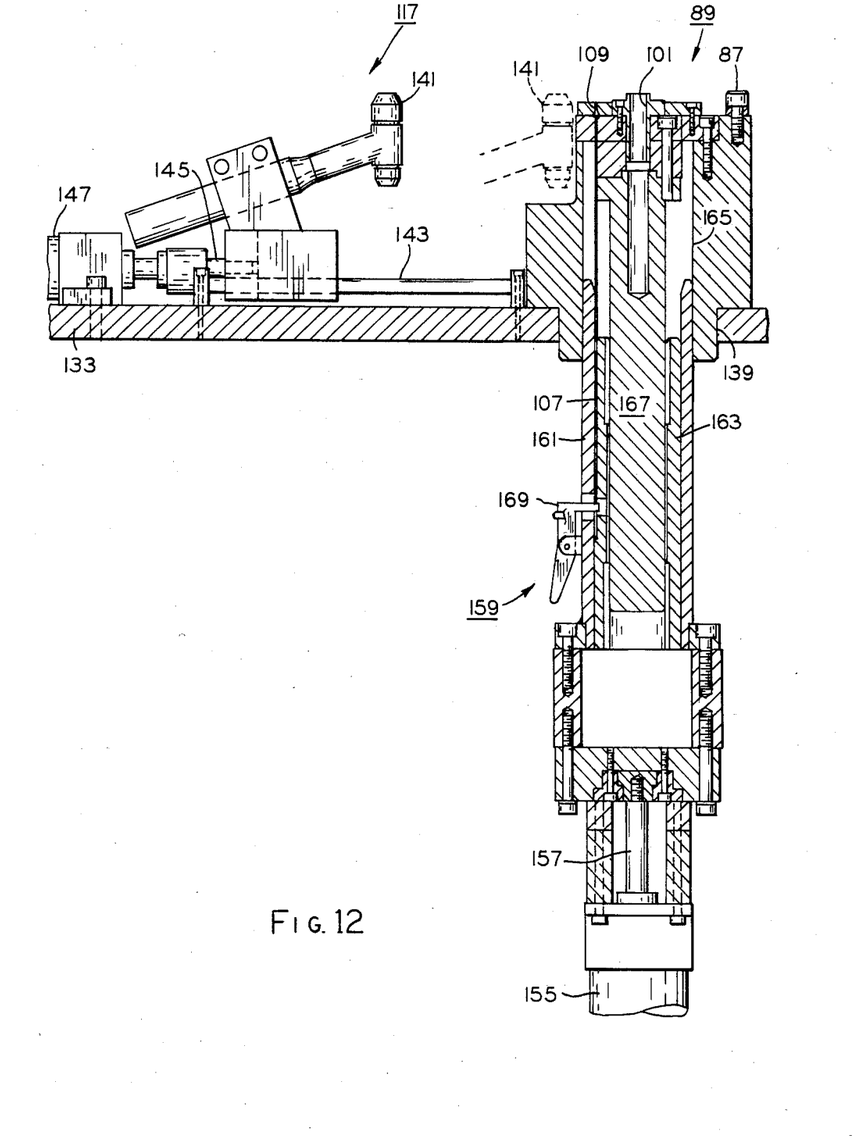
FIG. 12 is a partial sectional view taken along line 12—12 in FIG. 11.

Lower assembly fixture 89 is generally centrally located on intermediate plate 135 of apparatus 91 by suitable means (not shown), and the fixture extends through an opening 139 provided therefor in the intermediate plate, as best seen in FIGS. 11 and 12. The aforementioned welding means 117 include a set of four plasma needle arc welding torches 141 which are respectively slidably arranged on guide rods or rails 143 secured to intermediate plate 135 generally about lower assembly fixture 89, and the torches are respectively drivenly connected for conjoint reciprocal movement with a respective drive or piston rod 145 of a set of actuating means, such as for instance a servo motor 147 or the like which may be of the double acting air or hydraulic motor type. Thus, upon actuation of servo motors or actuating means 147, torches 141 are protractively movable from a retracted or at rest position on guide rails 143 toward the preselected welding or protractive positions thereof, as shown in dotted outline in FIG. 12, adjacent lower assembly fixture 89 to generally conjointly create welds 119 interconnecting end frame 27 with tabs 41 of beams 39, as previously discussed and as illustrated in FIGS. 7-9. Torches 141 are available from the Linde Division of the Union Carbide Corp., Chicago, Ill. under model number 997450. Although welding means 117 and torches 141 are illustrated herein for purposes of disclosure, it is contemplated that other welding means of various other types may be utilized within the scope of the invention so as to meet at least some of the objects thereof.

Locking mechanism 103 also includes actuating means, such as for instance a servo motor 149 or the like which may be of the double acting air or hydraulic type, and actuating means or servo motor 149 is mounted by suitable means to intermediate plate 135 of apparatus 91 generally adjacent lower assembly fixture 89 thereon, as best seen in FIGS. 4 and 11. Plunger 105 of locking mechanism 103 is reciprocably slidably movable in a passage means, such as for instance a groove or slot 151 or the like, provided therefor in lower assembly fixture 89 and which intersects or opens into locating sleeve 101 thereof, as best seen in FIGS. 4 and 11. Locking plunger 105 is drivenly connected for conjoint reciprocal movement with a drive or piston rod 153 of servo motor 149. Thus, upon actuation of servo motor 149, plunger 105 of locking mechanism 103 is protractively and retractively movable between an a rest position, as best seen in FIG. 11, and a protracted or actuated position, as best seen in FIG. 4. Of course, in its protracted position, locking plunger 105 is engaged in holding relation with shaft end portion 45 of rotatable assembly 25 received within location sleeve 101 of lower fixture assembly, as previously discussed and as best seen in FIG. 4.

As best seen in FIGS. 10-12, another actuating means, such as for instance a servo motor 155 or the like which may be of the double acting air or hydraulic type, is mounted by suitable means to base plate 133 of apparatus 91 and includes a reciprocably movable drive or piston rod 157 which is drivingly connected with means, such as a shim support or guide mechanism 159 for instance, for supporting shims 107. Shim guide mechanism 159 includes a pair of generally concentrically arranged cylinders or sleeves 161, 163 for carrying shims 107 and which are interconnected by suitable means with piston rod 157 of servo motor 155 so as to be conjointly reciprocably movable therewith, respectively. Outer shim carrying sleeve 161 is slidably and guidably received in a bore 165 generally axially or vertically provided therefor through the lower end portion of lower assembly fixture 89, and inner shim carrying sleeve 163 is slidably and guidably received about a guide rod 167 carried by the lower assembly fixture and extending generally concentrically through the lower assembly fixture bore downwardly therefrom toward base plate 133 of apparatus 91. The lower end portions of shims 107 are received between shim carrying sleeves 161, 163, and the upper end portions of the shims are slidably received in shim passage 109 provided therefor in lower assembly fixture 89. Quick disconnect means, such as for instance a set of latches 169 or the like, are respectively pivotally mounted on outer shim carrying sleeve 161 for positioning engagement with shims 107 so as to facilitate quick release thereof whenever it is necessary to change the shims. Thus, upon actuation of servo motor 155, shim actuating mechanism 159 and shims 107 are conjointly protractively movable upwardly from an at rest or retracted position, as best seen in FIG. 12, toward a protracted or actuated position so as to affect the upward movement of shims 107 through shim passages 109 in lower assembly fixture 89 thereby to position the shims about peripheral surface 79 of rotor 47, as previously discussed and best seen in FIGS. 5 and 12.

Upper assembly fixture 113 includes a carrier plate 171 having a generally central portion 173 secured by suitable means to the lower end of a reciprocably movable drive or piston rod 175 of another actuating means, such as for instance a servo motor 177 or the like which may be of a double acting air or hydraulic type, and actuating means or servo motor 177 is, in turn, secured by suitable means to top cross plate 137 of frame 131 in apparatus 91, as best seen in FIGS. 10, 13, and 14. A set of arms 179 are integrally provided on carrier plate 171 emanating generally radially from central portion 173 of the carrier plate, and the aforementioned welding means 117a are fixedly mounted by suitable means to the upper side of the carrier plate arms, respectively. Welding means 117a includes another set of four plasma needle arc welding torches 181 which are generally similar to welding torches 141 discussed above, and the nozzles of torches 181 extend through a set of openings 183 provided in preselected locations therefor through central portion 173 of carrier plate 171, respectively. Springs 115 are carried on a set of retainers 185 therefor secured to carrier plate 171 generally adjacent central portion 173 and extending from the lower side thereof, respectively. Thus, upon actuation of actuating means or servo motor 177, upper assembly fixture 113 is protractively movable from a retracted or at rest position thereof, as seen in FIGS. 10 and 13, downwardly toward lower assembly fixture 89 on cross plate 135 of apparatus 91 into a protracted or actuated position, as best seen in FIG. 9. Upon this protractive movement of upper assembly fixture 113 into the actuated position thereof, springs 115 on the lower side of the upper assembly fixture are biased into engagement with end frame 27a and welding torches are predeterminately positioned to create welds 119a interconnecting end frame 27a with tabs 41a of beams 39, as previously discussed and as illustrated in FIGS. 7-9.

From the foregoing, it is now apparent that a novel apparatus 91 has been presented meeting the objects set out hereinbefore, as well as others, and that changes as to the precise arrangements, shapes, details and connections of the components of such apparatus may be made by those having ordinary skill in the art without departing from the spirit of the invention or from the scope thereof as set out in the claims which follow.

What we claim as new and desire to secure by Letters Patent of the United States is:

1. Apparatus for assembling a dynamoelectric machine having a stationary assembly and a rotatable assembly, the stationary assembly including a stator having a bore therethrough, a set of beams secured to the stator and having a pair of opposite ends with a pair of oppositely extending tabs thereon, respectively, a pair of opposite end frames having a pair of sets of apertures therethrough with the apertures being sized predeterminately larger than the tabs, respectively, and at least one of the end frames having a generally central opening therethrough, the rotatable assembly including a shaft having a pair of opposite end portions with a rotor secured to the shaft between the opposite end portions thereof, the apparatus comprising:

supporting means disposed in a stationary position in the apparatus for seating the at least one end frame;

means on said supporting means for engagement with at least a part of the at least one end frame to locate it generally in a preselected position on said supporting means;

recess means associated with said supporting means for receiving one of the opposite ends of said shaft with the one opposite end portion of the shaft extending through the generally central opening in the at least one end frame and for aligning the rotatable assembly in a preselected position generally along a preselected axis;

means associated with said supporting means for locking engagement with the one opposite end portion of the shaft received in said recess means so as to maintain the rotatable assembly against displacement from the preselected position thereof;

means for advancing a set of shims generally about the rotor of the rotatable assembly when in its preselected position, said shim set being engaged between the rotor and the stator bore to establish a preselected air gap therebetween upon the disposition of the stator bore about said shim set and the rotor with the tabs on one of the opposite ends of the beams extending at least in part into one of the aperture sets in the at least one end frame in spaced apart relation therefrom and with one of the opposite ends of at least one of the beams in seating engagement with the at least one end frame, respectively;

means movable in the apparatus for resiliently urging the other of the end frames toward seating engagement with the other of the opposite ends of at least two of the beams when the other of the aperture sets in the other end frame are arranged generally about the other of the tabs on the other opposite ends of the beams in spaced apart relation therewith, respectively, and a pair of sets of means for generally simultaneously welding at least a part of each tab of the one and other tabs to a part of the at least one end frame and other end frame at least generally adjacent each aperture of the one and other aperture sets with the tabs and the aperture sets in the spaced apart relation thereof, respectively.

2. Apparatus for securing a set of beams on a stationary assembly for a dynamoelectric machine to a pair of opposite end frames thereof, the beams having a pair of sets of tabs on opposite end portions thereof, respectively, and the end frame having a pair of sets of apertures extending therethrough predeterminately larger than the tabs, respectively, the apparatus comprising:

means for locating one of the end frames with one of the opposite ends of at least one of the beams being seated thereon and with one of the tabs on the one opposite ends of the beams being received in one of the aperture sets of the one end frame in spaced apart relation therefrom, respectively;

means for biasing the other of the end frames against the other of the opposite ends of at least two of the beams with the other of the tabs on the other opposite ends of the beams being received in the other of the aperture sets in the other end frame in spaced apart relation therefrom, respectively; and means for generally simultaneously welding at least a part of each of the one and other tabs to a part of the one and other end frames at least generally adjacent each aperture of the one and other aperture sets when the tabs and the aperture sets are in the spaced apart relation thereof, respectively.

3. The apparatus as set forth in claim 2 wherein said locating means includes a seat on which the one end frame is oriented.

4. The apparatus as set forth in claim 2 wherein said locating means includes means for association with a part of the one end frame to insure preselected orientation of the one end frame on said locating means.

5. The apparatus as set forth in claim 2 wherein said welding means comprises a pair of sets of welding torches, one of said welding torch sets being mounted on said resiliently urging means so as to be conjointly movable therewith and the other of said welding torch set being movably mounted on the apparatus adjacent said supporting means.

6. Apparatus for assembling a dynamoelectric machine having a stationary assembly and a rotatable assembly, the stationary assembly including a stator having a bore, a set of beams secured to the stator with a pair of sets of oppositely extending tabs on a pair of sets of opposite ends of the beams, respectively, a pair of opposite end frames having a pair of sets of apertures therethrough with the apertures being predeterminately sized larger than the tabs, respectively, and at least one of the end frames having a generally central opening therethrough, the rotatable assembly including a shaft having a pair of opposite end portions with a rotor secured to the shaft between the opposite end portions thereof, the apparatus comprising:

a pair of relatively movable assembly fixtures with one of said assembly fixtures including stationary seating means for supporting the at least one end frame in an assembly position thereon;

recess means in said one assembly fixture for receiving one of the shaft end portions with the one shaft end portion extending through the generally central opening of the at least one end frame in its assembly position on said stationary seating means;

means associated with said one assembly fixture for locking in engagement with the one shaft end portion received in said recess means to dispose the rotatable assembly in a preselected position;

means for establishing a preselected air gap between the stator bore and the rotor when the at least one end frame is in its assembly position and the rotor is in its preselected position upon the disposition of the stator about the rotor with one of the tab sets of the beams predeterminately positioned within and in spaced apart relation from one of the aperture sets in at least one end frame and with one of the opposite ends of at least one of the beams seated against the at least one end frame in its assembly position, respectively;

resilient means on the other of said assembly fixtures for biasing engagement with the other of the end frames;

motor means associated with the other assembly fixture for moving it toward the one assembly fixture to effect the biasing engagement of the resilient means with the other end frame seating it against the other of the opposite ends of at least two of the beams with the other of the tab sets being received within and in spaced apart relation from the other aperture set in the other end frame, respectively;

a pair of sets of means movable toward welding preselected positions for welding the end frames with the tab sets in the spaced apart relation thereof within the aperture sets, respectively, one of said welding means sets being mounted to said other assembly fixture so as to be conjointly movable toward the preselected welding positions when the other assembly fixture is actuated by said motor means; and a set of means associated with said welding means of the other of said welding means sets for actuating them toward the welding preselected positions thereof, respectively.

7. The apparatus as set forth in claim 6 wherein said air gap establishing means includes a set of shim means shimming engagement between the stator bore and rotor.

8. The apparatus as set forth in claim 7 wherein said air gap establishing means further includes means for advancing said shim means set to a position about the rotor prior to the disposition of the stator bore about the rotor.

9. The apparatus as set forth in claim 8 wherein said one assembly fixture includes a set of passage means extending therethrough for guiding engagement with said shim means set, respectively.

10. Apparatus for assembling a dynamoelectric machine having a stationary assembly and a rotatable assembly, the stationary assembly including a stator having a bore therethrough, a set of beams secured to the stator and having at least one set of end portions with a set of tabs extending therefrom, respectively, and at least one end frame including a generally central opening therein, and a set of apertures through the at least one end frame and sized predeterminately larger than the tabs, respectively, the apparatus comprising:

stationary means on the apparatus for supporting the at least one end frame in a preselected position generally against displacement therefrom, the tabs on the beams being received in the apertures of the at least one end frame in spaced apart relation from the apertures and the end portion of at least one of the beams being seated against the at least one end frame thereby to space the stator therefrom when the at least one end frame is in its preselected position on said supporting means;

means in said supporting means for locating in engagement with a part of the rotatable assembly to dispose the rotatable assembly in a preselected position, the rotatable assembly extending through the bore of the stator and the rotatable assembly part extending through the central opening of the at least one end frame in its preselected position on said supporting means when the rotatable means is disposed in its preselected position;

means associated with said locating means and operable generally for locking in engagement with the rotatable assembly part to retain the rotatable assembly against displacement from its preselected position; and means for welding at least a part of each tab to a part of the at least one end frame at least adjacent each aperture when the tabs and apertures are in the spaced apart relation thereof, respectively.

11. The apparatus as set forth in claim 10 wherein the stationary assembly further includes a set of other end portions on the beams generally opposite the at least one end portion set with a set of other tabs extending from the other end portions, respectively, and the dynamoelectric machine also having another end frame with a set of other tabs therethrough sized predeterminately larger than the other tabs, respectively, and wherein the apparatus further comprises means for urging the another end frame against the other end portions of at least two of the beams with the other tabs being received in the other apertures of the another end frame in the spaced apart relation therefrom, respectively.

12. The apparatus as set forth in claim 11 wherein the apparatus further comprises another set of means for welding at least a part of each other tab to a part of the other end frame at least adjacent the other apertures therein in the spaced apart relation of the other tabs and other apertures, respectively.

* * * * *